Figures 1, 2:
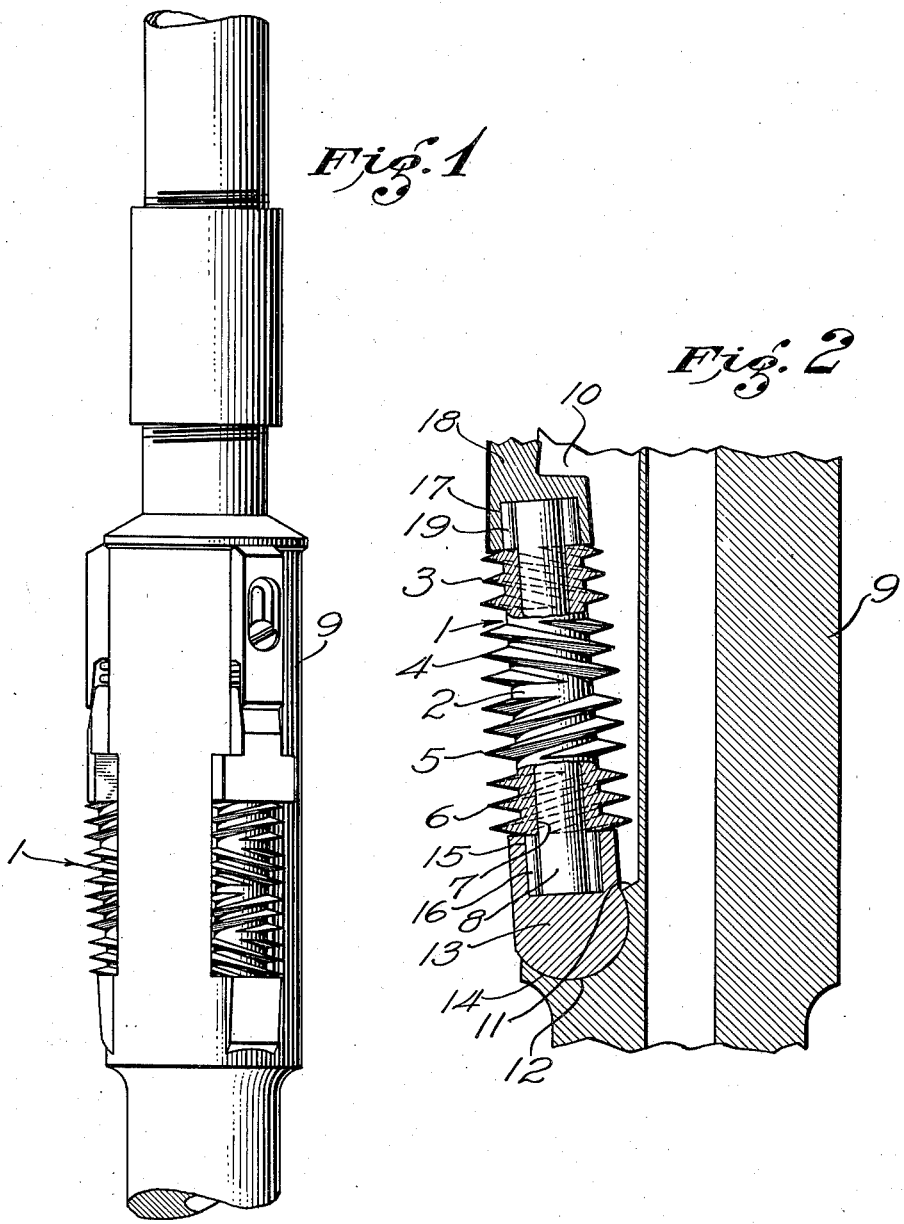

Aug. 9, 1938.     H. C. SMITH     2,126,145
CUTTER
Filed Oct. 14, 1935

INVENTOR
HERMAN C. SMITH
BY
J. Calvin Brown
ATTORNEY

Patented Aug. 9, 1938

2,126,145

UNITED STATES PATENT OFFICE 2,126,145

CUTTER

Herman C. Smith, Whittier, Calif.

Application October 14, 1935, Serial No. 44,907

2 Claims. (Cl. 255—73)

This invention relates to improvements in cutters for use in connection with tools adapted to cut formations. Specifically, the invention has to do with a cutter which may be used with underreamers of the character employed for oil field production work.

An object of the invention is to provide a cutter which, when actuated, will not track in the formation. By this I mean a cutter so constructed that it will constantly operate upon new formation and not follow any particular groove or cut portion already made.

Another object is the provision of a cutter which when associated with a carrying tool, is so constructed and arranged as to relieve end thrust between the cutter and the said holding tool.

Another object of the invention is the provision of a cutter which, when associated with a holding tool, will advance into formation by shearing and chipping the same.

Another object is the provision of a cutter adapted to operate efficiently to cut either hard or soft formation.

Other objects of the invention include a cutter which is simple of construction, inexpensive in cost of manufacture, and superior to cutters now known to the inventor.

With the above and other objects in view, the invention consists in the novel and useful provision, formation, construction, association, and interrelation of parts, members and features, all as shown in certain embodiments in the accompanying drawing, described generally, and more particularly pointed out in the claims.

In the drawing:

Figure 1 is a fragmentary side elevation of an underreamer incorporating the improved cutters, and, Figure 2 is a fragmentary longitudinal sectional view of one of the cutters shown in cooperation with the tool of Figure 1.

Referring now to the drawing, the improved cutter is designated as an entirety by 1, and the same includes a shank 2 having on the periphery thereof threaded areas as shown at 3, 4, 5 and 6. The number of threaded areas will vary in accordance with use and service, and I do not intend to imply by the statement just made that only four threaded areas are intended. Each contiguous threaded area differs in that one threaded area will include a helical right thread, as shown at 3, the next contiguous area a helical left thread, as shown at 4, and so on, contiguous threaded areas alternating as to thread direction; for instance, 5 is a right threaded area and 6 a left threaded area. Furthermore, the diameter of the shank may or may not remain the same throughout its length, although in the present instance, the shank is shown as having a constant diameter with a variation in the pitch diameter of certain of the threaded areas. For instance, the threaded areas 5 and 6 may have the same pitch diameter while the threaded areas 3 and 4 may be different as to pitch diameter, the pitch diameters of the areas 5 and 6 being greater than the pitch diameters of the areas 3 and 4, and the area 3 having the least pitch diameter. This construction is useful when the cutter is utilized in certain installations, such as, for instance, illustrated in the drawing wherein the cutter is shown incorporated in an underreamer. The cant of the threads may vary to suit any working condition for the cutter. In the present instance, the cant is shown as being 30 degrees relative to the axis of the shank.

The shank may be provided with a longitudinal bore 7 through which is adapted to be passed a bearing pin 8.

In utilizing the present cutter, reference is made to my co-pending application for patent for Underreamers, Serial No. 44,908, filed October 14, 1935, wherein a tool incorporating the invention is specifically described. In the present instance, I provide an underreamer 9, which is secured to the usual drill string, a portion of the body of said underreamer being channeled at 10. An end wall 11 bounding said channel 10 is provided with a curved socket 12. A block 13 having a curved base 14 is seated within said curved socket 12, and whereby said members may relatively rock. This block 13 is provided with a bore 15. The pin 8 is received within said bore and within the annular space included between said pin and said bore are interposed roller bearings 16. The opposite end of said pin is received within a bore 17 of a block 18 and interposed between the periphery of the pin and the bore are rollers 19.

In operation, when the teeth of the cutter are engaging formation, it will be seen that the right threads tend to feed the cutter in one direction relative to the pin. However, this tendency to feed is resisted by the left threads, with the result that thrust against the bearings is relieved. This construction stabilizes the cutter, and the cutter will not track upon the cut formation for the reason that the threads are alternately left and right. Consequently, new formation is encountered and a chipping action on the formation is maintained, which is effective to cut both hard and soft formations.

I claim:

1. An underreamer cutter, including a shank, a right screw threaded zone upon said shank, a contiguous left screw threaded zone upon said shank, the left threaded zone and the right threaded zone being of different pitch diameter.

2. An underreamer cutter, including a shank, alternate zones of right and left hand screw threaded areas on said shank, two of said threaded areas having the same pitch diameter, the other threaded areas being of different pitch diameter.

HERMAN C. SMITH.